United States Patent [19]

Hawkins

[11] Patent Number: 4,759,621

[45] Date of Patent: Jul. 26, 1988

[54] HORIZONTAL VIDEO VIEWER

[76] Inventor: Junior F. Hawkins, 3120 W. 16th St., Wichita, Kans. 67203

[21] Appl. No.: 48,145

[22] Filed: May 11, 1987

Related U.S. Application Data

[63] Continuation-in-part of Ser. No. 881,667, Jul. 3, 1986, abandoned.

[51] Int. Cl.⁴ .................... G02B 7/18; G02B 23/02; G02B 23/08; G02B 5/08
[52] U.S. Cl. .................................. 350/623; 350/639; 248/474; 248/480
[58] Field of Search ............... 350/623, 624, 618, 619, 350/620, 638, 632, 639, 626; 248/472, 473, 474, 480, 486

[56] References Cited

U.S. PATENT DOCUMENTS

| 862,833 | 8/1907 | May | 350/626 |
| 1,245,144 | 10/1917 | Bright | 350/618 |
| 1,584,938 | 5/1926 | Higbee | 350/623 |
| 4,605,291 | 8/1986 | Jolly | 350/618 |

FOREIGN PATENT DOCUMENTS 241921 6/1926 United Kingdom ............... 350/618

Primary Examiner—Jon W. Henry
Attorney, Agent, or Firm—John Wade Carpenter

[57] ABSTRACT

This invention provides a viewing device which permits data displayed on a computer screen and similar terminals to be seen by viewing the reflection of the data in mirrors within the viewing device. The viewing device permits viewing of the data at approximately the same level and angles as paper documents might be viewed. A method for assembling and adjusting a viewing device.

8 Claims, 4 Drawing Sheets

HORIZONTAL VIDEO VIEWER

This is a continuation-in-part application of my co-pending application Ser. No. 881,667, filed July 3, 1986 and now abandoned.

BACKGROUND OF THE INVENTION

1. Field of the Invention

This invention relates to a viewing device and a method whereby data shown on a computer screen may be viewed by viewing the reflection of the data in mirrors within the viewing device.

2. Description of the Prior Art

G.B. No. 0241921, June 1986, teaches a reflector system for use with an apparatus provided with keys. Jolly in U.S. Pat. No. 4,605,291 teaches a cathode ray tube screen viewing aid. None of the foregoing prior art patents teach or suggest the particular viewing device and method of this invention.

SUMMARY

This invention permits data shown on a computer screen to be viewed in a reflective viewing device at approximately the same level as paper documents would be viewed.

By viewing at paper level, the viewing device of this invention reduces considerable up and down head movement and is especially helpful to those who must wear either bi-focals or tri-focal glasses because it is most difficult for those who wear these glasses to readily find the correct viewing area when switching from data being loaded on the computer to the screen, which is at a different distance, in order to determine the accuracy of any entries made or to read data displayed.

The horizontal video viewer of this invention also reduces fatigue and glare since the displayed material may be viewed at different levels and different angles.

The present invention accomplishes its desired objects by broadly providing a viewing device for facilitating the viewing of images on a screen comprising a base; a lower mirror removably disposed within the base; and a lower support means secured to the base. An upper support means is pivotally connected to the lower support means to pivot the upper support means relative to the lower support means. The upper support means has a structure defining an elongated slot. An upper mirror frame is slidably secured to the upper support within the elongated slot; and an upper mirror is slidably disposed within the upper mirror frame.

The present invention further accomplishes its desired objects by broadly providing a method for assembling and adjusting a viewing device comprising the steps of:

(a) sliding an upper mirror into a U-shaped channel within an upper mirror frame;

(b) securing subsequently the upper mirror frame within an elongated slot of an upper support that is pivotally secured to a lower support having connected thereto a base with an opening and a perimetrical recess around the opening;

(c) disposing an edge of a lower mirror in a portion of the perimetrical recess;

(d) positioning a brace member underneath the lower mirror and within the perimetrical recess; and (e) sliding the brace member along the perimetrical recess in a given direction to either raise or lower the lower mirror to adjust the same relative to the upper mirror.

Further objects of my invention will become apparent from consideration of the drawings and the ensuing description thereof.

DESCRIPTION OF THE PREFERRED EMBODIMENT

Figure 12:
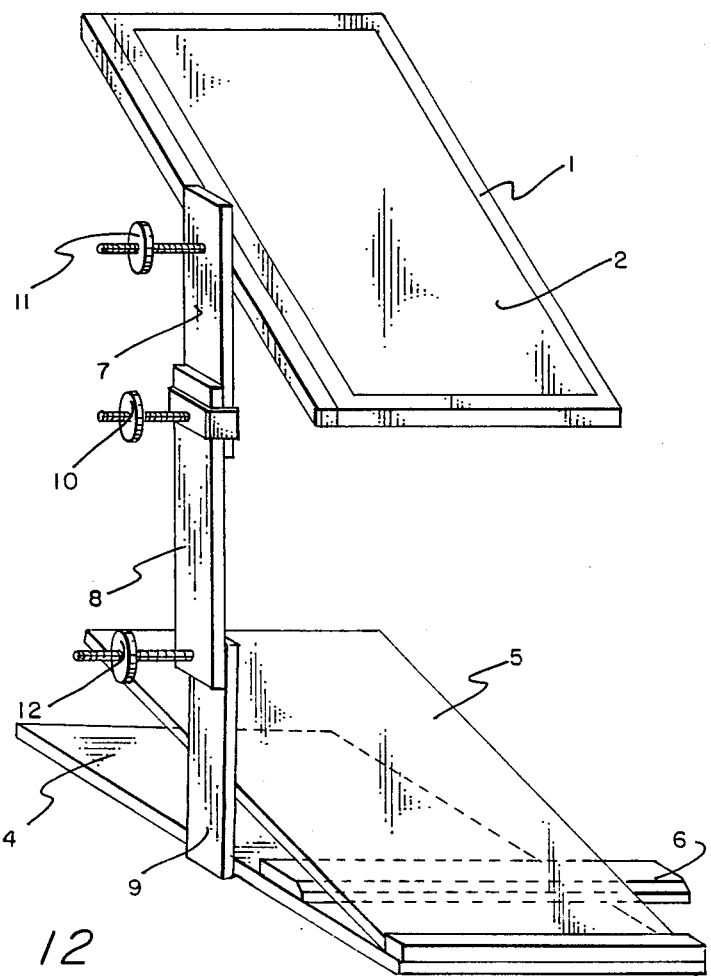
FIG. 12 is a perspective view of another embodiment of the viewing device.

The horizontal video viewer in FIG. 12 uses a top mirror 2 to transfer images from the computer screen to a lower mirror 5 where data can be viewed by the operator. The top mirror 2 is secured in frame 1 by glue, screws or other suitable means. The frame 1 may be constructed from plastic, metal, wood or other suitable material which will secure the top mirror 2 in its proper location. The back of the top mirror 2; frame 1 and related parts may be covered for appearances purposes.

The frame 1 is secured to top column 7 by the top adjustment screw 11. The top adjustment screw 11 permits the frame 1 and top mirror 2 and related parts to turn in such a manner that the screen image can be displayed on the lower mirror 5. The top adjustment screw 11 is constructed from metal, nylon or other commercially available material and has a nut or other locking type of device attached in such a manner that when loosened the frame 1 will turn on the bearing surface of the top adjustment screw 11 or otherwise be permitted to turn and when the locking device is tightened, it will secure the frame 1 in whatever location it was positioned while said top adjustment screw 11 was loosened. The top column 7, mid column 8 and bottom column 9 as well as base 4 and lever 6 may be constructed from plastic, wood, metal or other suitable material. The top column 7 is attached to the mid column 8 by height adjustment screw 10. The height adjustment screw 10 may be constructed from metal, plastic or other material which when loosened will permit the top column 7 to move up and down alongside the mid column 8 and when the height adjustment screw 10 is tightened, the top column 7 will be firmly secured to the mid column 8.

The mid column 8 is also attached to the bottom column 9 by the bottom adjustment screw 12. The bottom adjustment screw 12 is constructed from metal, nylon or other commercially available material and has a locking nut or device attached in such a manner that when loosened it will permit the mid column 8 to move in such a manner that the top mirror 2 may be positioned so that any images on the computer screen will be displayed in the bottom mirror 5. The bottom column 9 is secured at one end to the base 4 with screws or other device in such a manner that the bottom column 9 is firmly secured to or the bottom column 9 may be an integral part of the base 4. The base 4 is constructed in such a manner that it will accommodate the lower mirror 5. The leverage 6 may also be placed on the base 4 and is used to elevate one end of the bottom mirror 5 to a comfortable viewing level and a level where the images on the computer screen may be readily seen in the bottom mirror 5. The leverage 6 may be a triangle, square or other shape which will permit the bottom mirror 5 to be elevated. The top mirror 2 and the bottom mirror 5 are commercially available clear mirrors.

Figure 11:
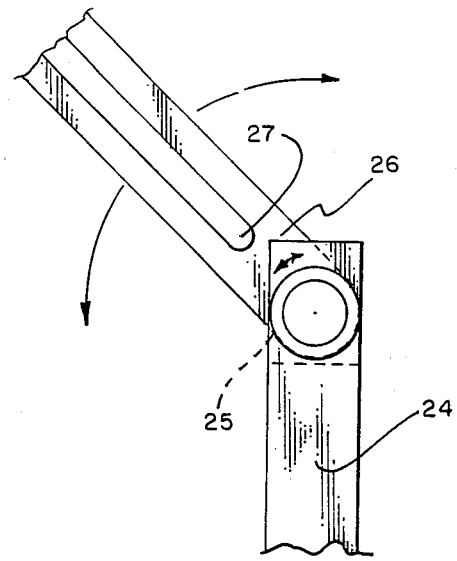
FIG. 11 is a partial front elevational view of the upper support pivoting about the lower support.

Referring in detail now to FIGS. 1-11 for a more preferred embodiment of the invention, there is seen a viewing device, generally illustrated as 20, which is for facilitating the viewing of images from or on a screen (not shown in the drawings). The viewing device 20 has a base, generally illustrated as 22; a lower support 24 having an L-shaped recess 25 and connected to the base 22; and an upper support 26 having an elongated slot 27 and pivotally connected in the L-shaped recess 25 to the lower support 24 through a threaded bolt 28, to pivot the upper support 26 relative to the lower support 24. A knob 30 threadably engages the threaded bolt 28 for tightening or loosening the upper support 26 against the lower support 24 in the L-shaped recess 25 to set the upper support 26 in a desired set position with respect to the lower support 24, as illustrated in FIG. 11.

An upper mirror frame, generally illustrated as 32, is slidably secured to the upper support 26 by a threaded bolt 34 passing through the elongated slot 27. A knob 36 threadably engages the threaded bolt 34 for tightening or loosening the upper support 26 against the upper mirror frame 32 to set the upper mirror frame 32 in a desired set position along the elongated slot 27.

Figure 9:
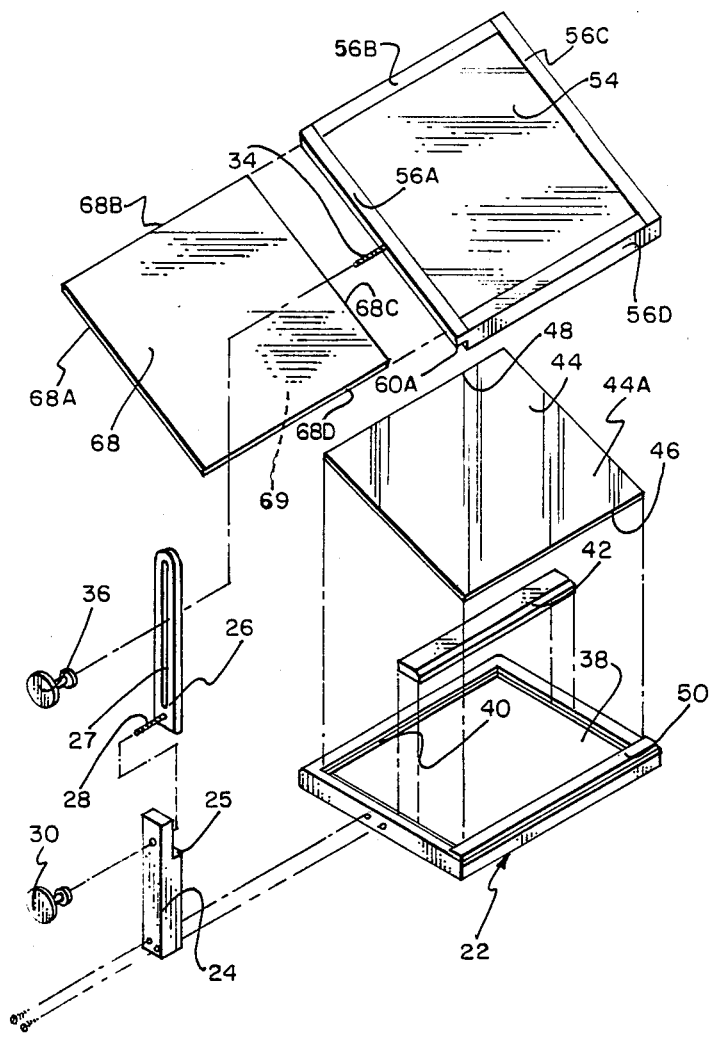
FIG. 9 is a segmented perspective view of the viewing device.
Figure 10:
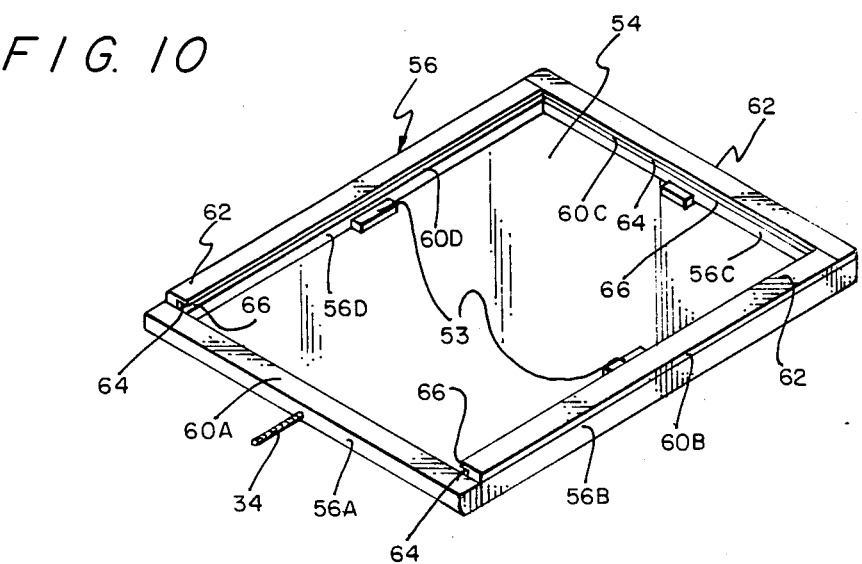
FIG. 10 is a perspective view of the upper mirror frame.

The base 22 has an opening 38 and a recess 40 circumscribing the perimeter of the opening 38. A brace 42 straddles and extends across the opening 38, and is slidably supported by the recess 40 such that the brace 42 may be slid along the recess 40 to raise or lower a lower mirror 44 that is removabley disposed within the base 22. The lower mirror 44 with the reflective surface at 44A has a pair of edges, 48 and 46 as illustrated in FIG. 5 and FIG. 9.

Figure 1:
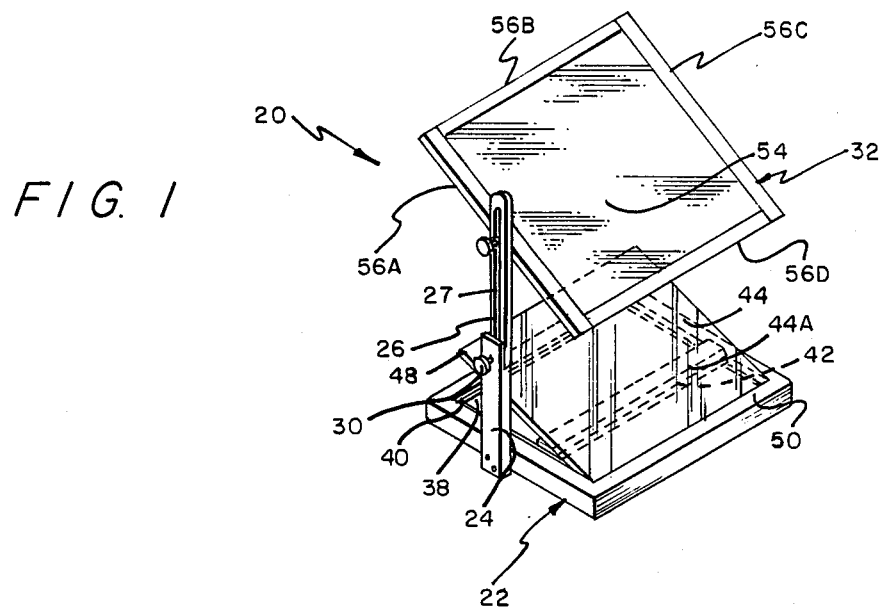
FIG. 1 is a perspective view of one embodiment of the viewing device.
Figure 2:
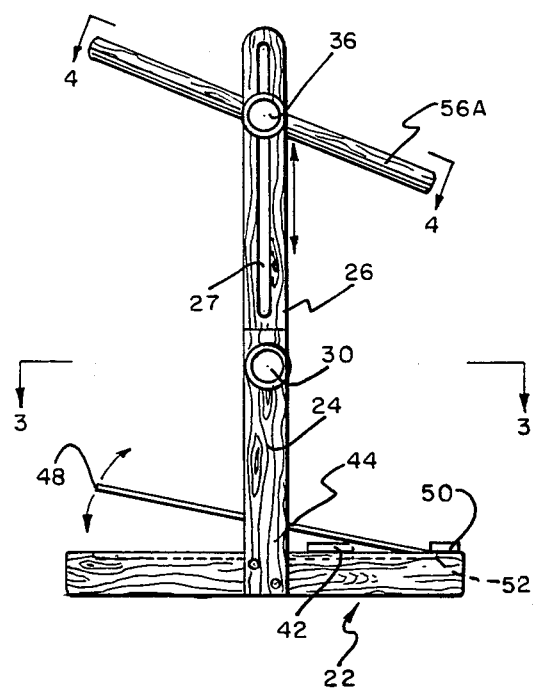
FIG. 2 is a side elevational view of the viewing device of FIG. 1.
Figure 3:
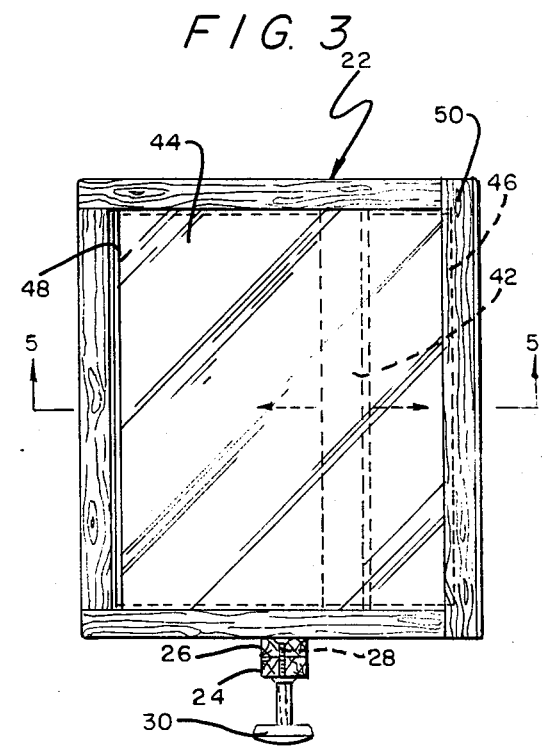
FIG. 3 is a horizontal sectional view taken in direction of the arrows and along the plane of line 3—3 in FIG. 2.
Figure 4:
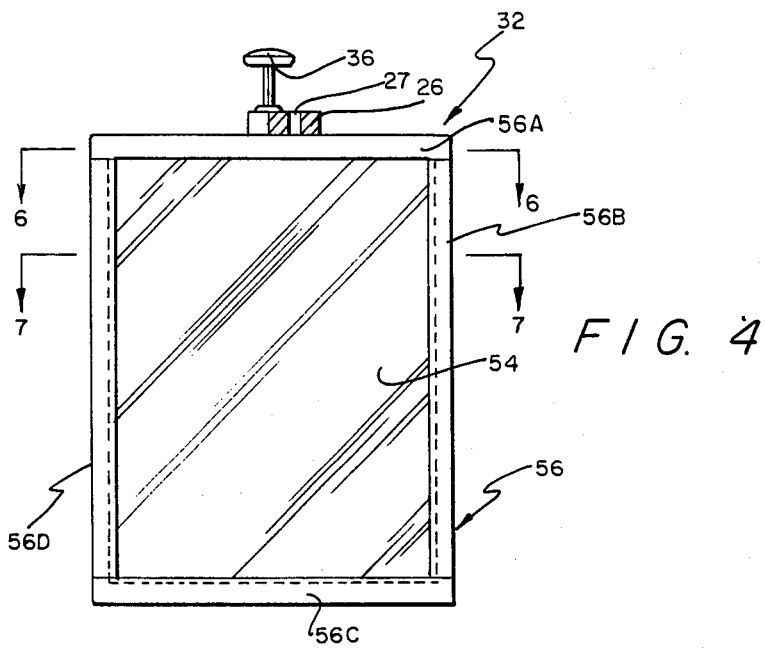
FIG. 4 is a horizontal sectional view taken in direction of the arrows and along the plane of line 4—4 in FIG. 2.
Figure 5:
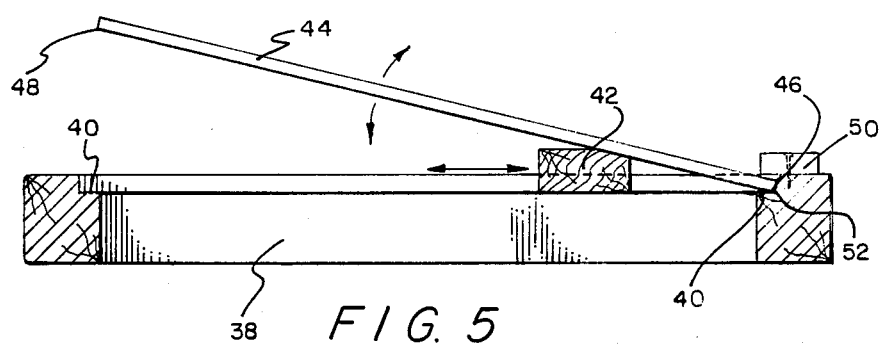
FIG. 5 is a vertical sectional view taken in direction of the arrows and along the plane of line 5—5 in FIG. 5.
Figure 6:
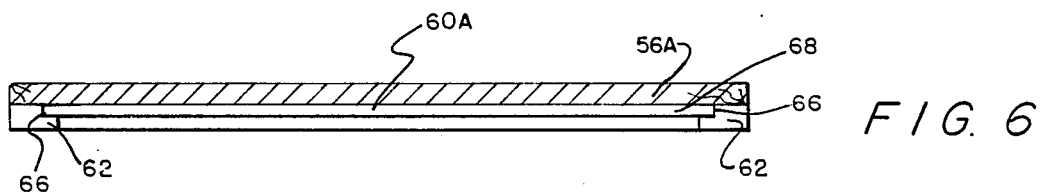
FIG. 6 is a vertical sectional view taken in direction of the arrows and along the plane of line 6—6 in FIG. 4.
Figure 7:
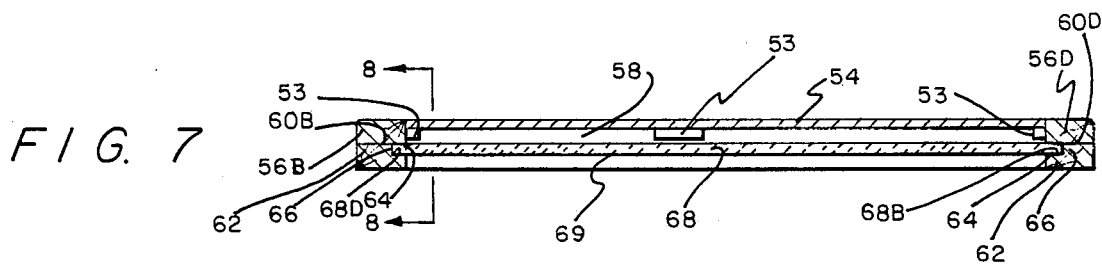
FIG. 7 is a vertical sectional view taken in direction of the arrows and along the plane of line 7—7 in FIG. 4.
Figure 8:
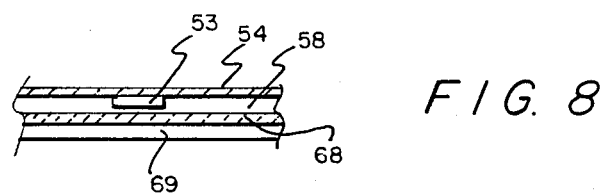
FIG. 8 is a partial vertical sectional view taken in direction of the arrows and along the plane of line 8—8 in FIG. 7.

A lower flange member 50 is secured to the base 22 and extends over a portion of the perimetrical recess 40 (as illustrated in FIGS. 2 and 5) to form a channel 52 of generally U-shape in transverse cross-section. As depicted in FIG. 5, edge 46 of mirror 44 removably lodges within U-shaped channel 52 such that as the brace 42 is slid along the perimetrical recess 40 towards U-shaped channel 52, edge 48 (which is opposed to edge 46) of the mirror 44 rises with respect to edge 46, and as the brace member 22 is slid along the perimetrical recess 40 away from the U-shaped channel 52, the edge 48 is lowered with respect to the edge 46.

The upper mirror frame 32 comprises a back 54 and a generally rectangular frame, generally illustrated as 56, secured to the back 54. Frame supports 53 are secured to the back 53 and to the rectangular frame 56 (more specifically one of the rectangular sections mentioned below). The rectangular frame 56 has four rectangular sections 56A, 56B, 56C and 56D rising above the back 54 to form a rectangular recess 58. Rectangular sections 56A, 56B, 56C and 56D has perimetrical faces 60A, 60B, 60C and 60D, respectively. An upper flange member 62 with an L-shaped flanged channel 64 is secured to perimetrical faces 60B, 60C, and 60D, leaving perimetrical face 60A of rectangular section 56A free or bare of the upper flange member 62. When the upper flange member 62 is secured as such, a channel 66 (U-shaped in transverse cross-section) is formed transversing perimetrical faces 60B, 60C and 60D. Alternatively, channel 66 may be formed integrally with rectangular sections 56B, 56C and 56D. The bolt 34 passes through the rectangular section 56A to threadably connect with the knob 36.

An upper mirror 68, with the reflective surface at 69 facing reflective surface 44A of lower mirror 44, has edges 68A, 68B, 68C and 68D. Edges 68B, 68C and 68D of upper mirror 68 slidably lodge in U-shaped channel 66 to removably secure the upper mirror 68 to and within the upper mirror frame 32.

With continuing reference to FIGS. 1-11 for operation of the invention and the assembling of the viewing device 20, upper mirror 68 is initially slid into U-shaped channel 66 of the upper mirror frame 56 to sandwich within the latter the edges 68B, 68C, and 68D of the upper mirror 68. Subsequently, bolt 34 secured to upper frame 56 is slid into the elongated slot 27, and knob 36 is threadably engaged to bolt 34 to secure adjustably the upper mirror frame 56 within the elongated slot 27 of the upper support 26. Edge 46 of the lower mirror 44 is disposed in a portion of the perimetrical recess 40 (more preferably within U-shaped channel 52 as illustrated in FIG. 5), and brace 42 is positioned underneath the lower mirror 44 and within and on the perimetrical recess 40 to the supported by the latter. When the brace member 42 is slid in one direction (i.e. either toward or away from U-shaped channel 52 as illustrated in FIG. 5) mirror edge 48 (as well as a substantial part of the lower mirror 44 itself) is either raised or lowered, depending on which direction the brace member 42 is slid. Such elevation or lowering of the mirror edge 48 changes the angular position of a plane along the facial surface of the mirror 44, relatively to a horizontal plane in order to change the relative position of the lower mirror 44 to the upper mirror 68. Such relative position may be further adjusted by loosening knob 36 and sliding the upper mirror frame 56 along the elongated slot 27 to adjust the upper mirror frame 56 (including the upper mirror 68) relative not only to the lower mirror 44, but also the upper support 26. Also, the same may be further aided or accomplished by loosening knob 30 and pivoting the upper support 26 about the lower support 24. Obviously, after the desired positions have been accomplished, knobs 30 and 36 may be tightened to set the desired positions.

While the above description contains many specificities, these should not be construed as a limitation on the scope of the invention, but rather as an exemplification of one preferred embodiment thereof. Many other variations in size, shape and material are possible such as the use of concave and convex mirrors, lighted mirrors; and attach the unit to a computer screen and the like and still remain within the spirit of the invention. Therefore, the scope of the invention should be determined not by the embodiment illustrated but by the appended claims and their legal equivalents.

I claim:

1. A viewing device for facilitating the viewing of images on a screen comprising a base lying in a plane; a lower mirror removably disposed within said base and extending perpendicular to said base; a lower support means secured to said base; an upper support means pivotally connected to said lower support means to pivot the upper support means relative to the lower support means; said upper support means having a structure defining an elongated slot; an upper mirror frame slidably secured to said upper support means within said elongated slot; and an upper mirror slidably disposed within said upper mirror frame whereby said mirrors can be arranged to face in generally opposite directions to provide consecutive reflections from a field of view.

2. The viewing device of claim 1 additionally comprising a brace member slidably disposed within said base to raise or lower the lower mirror to a desired position.

3. The viewing device of claim 2 wherein said base has a structure defining an opening and a perimetrical recess around said opening, and said brace member straddles and extends across said opening and is slidably supported by said perimetrical recess such that said brace member may be slid along the perimetrical recess to raise or lower the lower mirror accordingly.

4. The viewing device of claim 3 additionally comprising a lower flange member secured to said base and extending over a portion of the perimetrical recess to form a generally lower U-shaped channel wherein an edge of said lower mirror removably lodges such that as said brace member is slid along the perimetrical recess towards said generally U-shaped channel, an edge of said lower mirror opposed to the lodged edge of same rises with respect to the lodged edge, and as said brace member is slid along the perimetrical away from said generally lower U-shaped channel said opposed edge of said lower mirror is lowered with respect to the lodged edge.

5. The viewing device of claim 1 wherein said upper mirror frame comprises a back; a generally rectangular frame secured to said back and having a rectangular perimeter having four rectangular sections and rising above said back to form a rectangular recess, each of said rectangular sections has a perimetrical face such that said rectangular perimeter has four perimetrical faces; an upper flange member having an L-shaped flange channel and secured to three of said four perimetrical faces to leave one perimetrical face of one rectangular section free of the upper flange member and to form in transverse cross section an upper U-shaped channel traversing three of said four perimetrical faces; and said upper mirror has three edges that slidably lodge in the upper U-shaped channel to removably secure the upper mirror to the upper mirror frame.

6. The viewing device of claim 5 additionally comprising an upper threaded bolt means extending through said rectangular section whose perimetrical face is free of the upper flange member, said upper threaded bolt means extends through said elongated slot of said upper support means; and an upper knob means threadably engaged to said upper threaded bolt for tightening the upper support means against the upper mirror frame to set the upper mirror frame in a desired set position along the elongated slot.

7. The viewing device of claim 1 wherein said lower support means has a structure defining a lower support L-shaped recess; and said upper support means pivotally lodges in said L-shaped recess; and a lower threaded bolt means passing through said upper support means and said lower support means to pivotally secure said upper support means in said L-shaped recess; and a lower knob means threadably engaged to said lower threaded bolt for tightening the upper support means against the lower support means in the L-shaped recess to set the upper support means in a desired set position with respect to the lower support means.

8. The viewing device of claim 5 additionally comprising at least one top frame support member secured to said back and one of the four rectangular sections of the rectangular frame.

* * * * *